(12) United States Patent
Morita et al.

(10) Patent No.: US 6,510,039 B1
(45) Date of Patent: Jan. 21, 2003

(54) DIELECTRIC CERAMIC COMPOSITION AND CERAMIC CAPACITOR

(75) Inventors: Koichiro Morita, Tokyo (JP); Tomoya Hagiwara, Tokyo (JP); Youichi Mizuno, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 10/151,922

(22) Filed: May 22, 2002

(30) Foreign Application Priority Data

Jun. 12, 2001 (JP) ........................................ 2001-176980

(51) Int. Cl.[7] .................................................. H01G 4/06
(52) U.S. Cl. ................. 361/321.2; 361/321.3; 361/321.4; 501/136; 501/137
(58) Field of Search ................. 361/311, 312, 361/313, 321.1, 321.2, 321.3, 321.4, 321.5; 501/134, 135, 136, 137, 138

(56) References Cited

U.S. PATENT DOCUMENTS

| | | | |
|---|---|---|---|
| 5,204,289 A | * | 4/1993 | Moh .......................... 428/450 |
| 5,734,545 A | * | 3/1998 | Sano et al. ............... 361/306.3 |
| 5,742,473 A | * | 4/1998 | Sano et al. ................. 361/303 |

* cited by examiner

*Primary Examiner*—Anthony Dinkins
(74) *Attorney, Agent, or Firm*—Bacon & Thomas, PLLC

(57) ABSTRACT

A dielectric ceramic composition includes sintered ceramic grains having a core-shell structure, wherein smaller than or equal to 50% of the grains have a domain width of twin less than 20 nm; 30% to 70% of the grains have a domain width of twin in the range from 20 nm to 50 nm; less than or equal to 50% of the grains have a domain width of twin greater than 50 nm or have no twin. A ceramic capacitor includes more than one internal electrode and one or more dielectric layers composed of a dielectric ceramic composition, each of the dielectric layers being sandwiched between two neighboring internal electrodes.

16 Claims, 1 Drawing Sheet

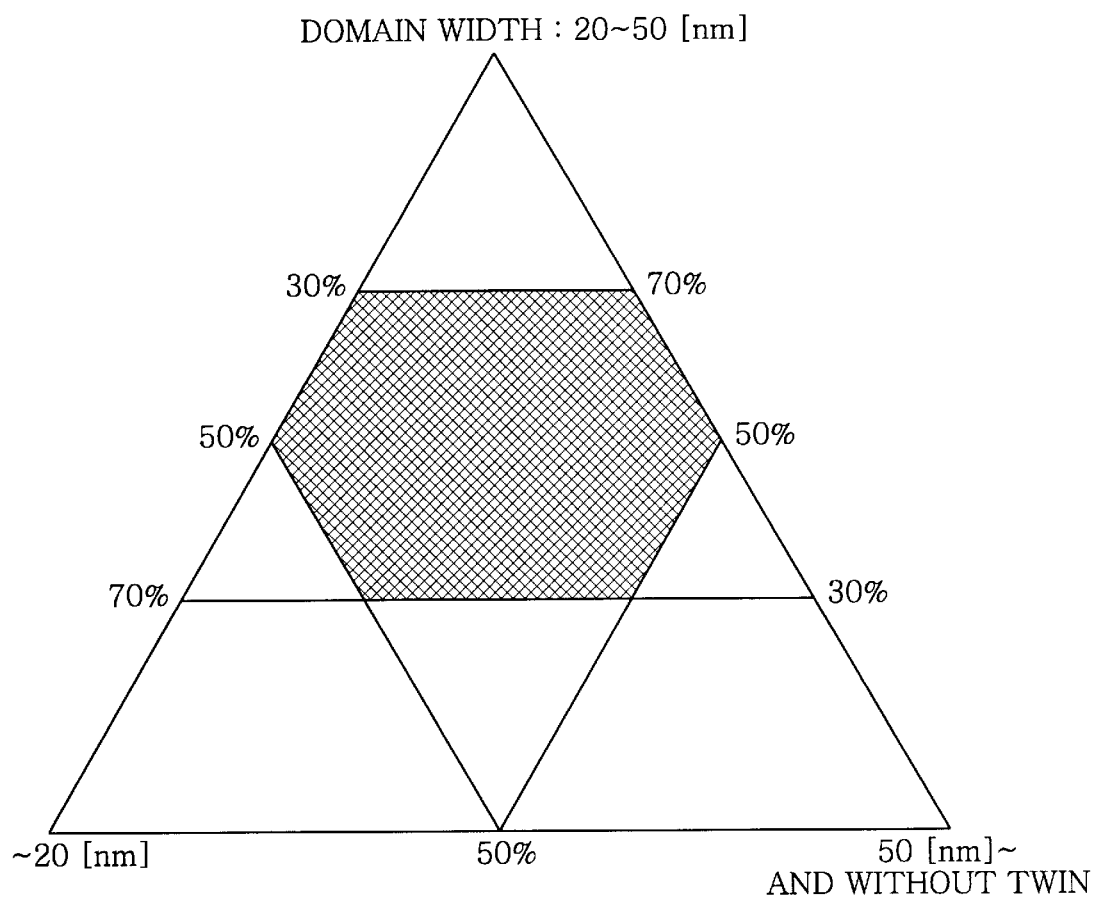

DIELECTRIC CERAMIC COMPOSITION AND CERAMIC CAPACITOR

FIELD OF THE INVENTION

The present invention relates to a reduction resistive dielectric ceramic composition containing therein ceramic grains of a core-cell structure and a ceramic capacitor including therein dielectric layers made by using such a ceramic composition.

DESCRIPTION OF THE PRIOR ART

Recently, a base metal, e.g., Ni, has been widely used in forming internal electrodes of a multilayer ceramic capacitor for the purpose of reducing manufacturing costs and various reduction resistive dielectric ceramic compositions capable of being sintered simultaneously with the internal electrodes composed of the base metal have been developed. One of the reduction resistive dielectric ceramic compositions is a barium titanate-based dielectric ceramic composition including ceramic grains of a core-shell structure.

However, in case where a multilayer ceramic capacitor, which fulfilled the X7R characteristic (EIA standards) or the B characteristic (EIAJ standards), is manufactured by employing a barium titanate-based dielectric ceramic composition having a dielectric constant equal to or greater than 3000 and internal electrodes composed of the base metal, such as Ni, capacitance aging become deteriorated.

SUMMARY OF THE INVENTION

It is, therefore, an object of the present invention to provide a multilayer ceramic capacitor yielding a maximum temporal capacitance variation not smaller than −30% with a voltage bias of 2 V/$\mu$m, even when a dielectric ceramic composition having a dielectric constant ($\in$) of greater than 3000 and a good reduction resistance to is used.

In accordance with one aspect of the present invention, there is provided a dielectric ceramic composition including: sintered ceramic grains having a core-shell structure, wherein smaller than or equal to 50% of the grains have a domain width of twin less than 20 nm; 30% to 70% of the grains have a domain width of twin in the range from 20 nm to 50 nm; less than or equal to 50% of the grains have a domain width of twin greater than 50 nm or have no twin.

In accordance with another aspect of the present invention, there is provided. a ceramic capacitor including more than one internal electrodes; and one or more dielectric layers composed of a dielectric ceramic composition, each of the dielectric layers being sandwiched between two neighboring internal electrodes, wherein the dielectric ceramic composition includes sintered ceramic grains having a core-shell structure, wherein smaller than or equal to 50% of the grains have a domain width of twin less than 20 nm; 30% to 70% of the grains have a domain width of twin in the range from 20 nm to 50 nm; less than or equal to 50% of the grains have a domain width of twin greater than 50 nm or have no twin.

BRIEF DESCRIPTION OF THE DRAWING

The above and other objects and features of the present invention will become apparent from the following description of preferred embodiments given in conjunction with the accompanying drawing, which shows an optimum range of twin domain width distribution of the grains constituting dielectric layers incorporated in a ceramic capacitor in accordance with the present invention.

DETAILED DESCRIPTION OF THE PREFERRED EMBODIMENTS

The term "twin" used herein refers to that represented by a group of parallel black and white line patterns formed in a barium titanate grain having a core-cell structure when observed along the (110) direction by a TEM (Transmission Electron Microscope); and the term "twin domain width" is a period of the line patterns measured in a perpendicular direction to the group of lines.

EXAMPLE 1

Compound powders of $Ho_2O_3$ of 1.0 mol part, MgO of 0.5 mol part, $Mn_2O_3$ of 0.25 mol part and oxide glass of 1.0 wt % having $Li_2O$—$B_2O_3$—$SiO_2$—$BaO$ as a main component were mixed with $BaTiO_3$ of 100 mol part and ground for 15 to 24 hours by employing a wet method in a ball mill containing therein PSZ (Partially Stabilized Zirconia) balls, to thereby obtain a mixture.

The main component, i.e., $BaTiO_3$, was in a form of powder manufactured by using a hydrothermal synthesis method yielding high crystallinity. The glass serves as a sintering additive, that makes a sintering be completed before a solid solution of an excessive amount of additive elements is formed in the core.

Next, the mixture was dehydrated, dried and calcined in air at 800° C. to obtain a calcined material. The calcined material was ground in ethanol and dried. The dried material was then mixed with an organic binder and a solvent to provide a ceramic slurry, which was then used for preparing green sheets having a thickness of 5 $\mu$m by employing a doctor blade method.

Subsequently, a conductive paste having Ni powder as a main component was applied on the green sheets by using a print method to form internal electrodes. Ten sheets of the ceramic green sheets having the internal electrodes thereon were stacked and thermocompressed to form a laminated body. The laminated body was then diced into a multiplicity of 3216 type chip-shaped ceramic bodies having a size of 3.2 mm×1.6 mm.

Thereafter, Ni external electrodes were formed on the chip-shaped ceramic bodies by using a dipping method. The organic binder contained in the chip-shaped ceramic bodies was removed in an $N_2$ atmosphere. The binder-removed ceramic bodies were then heat treated under an atmosphere having oxygen partial pressure in the order of $10^{-5}$ to $10^{-8}$ atm to obtain sintered bodies of a chip shape.

The sintered bodies were reoxidized in an $N_2$ atmosphere in a temperature range of 600 to 1000° C. to thereby obtain multilayer ceramic capacitors, wherein a thickness of each layer incorporated in the multilayer ceramic capacitor was about 3 $\mu$m.

Next, multilayer ceramic capacitors were polished in a direction perpendicular to the stacking direction of the ceramic green sheets until a thickness thereof became about 30 $\mu$m. Then, they were further thinned by applying ion milling. 300 grains in the dielectric layers disposed between the internal electrodes were observed by a TEM (Transmission Electron Microscope) along the (110) direction and the domain widths of the twins formed in each grain were measured.

The ratio of grains having the domain width less than 20 nm, from 20 nm to 50 nm, and greater than 50 nm are tabulated in Table. Since the observed domain width of twin varies depending on the observation direction, the domain width was measured in one direction, i.e., the (110) direction.

Next, for each specimen, dielectric constant and the temperature dependency of the temporal capacitance were measured and an experiment for the capacitance variations was performed.

The dielectric constant (∈) and a saturation or maximum value of temporal capacitance variation for each specimen are represented in Table. The temperature dependency of capacitance satisfied both X7R characteristic (EIA standards) and B characteristic (EIAJ standards).

Electrical characteristics were measured as follows:
(A) The dielectric constant (∈) was computed based on a facing area of a pair of neighboring internal electrodes, a thickness of a dielectric layer positioned between the pair of neighboring internal electrodes, and the capacitance of a multilayer ceramic capacitor obtained under the condition of applying at 20° C. a voltage of 1.0 V (root mean. square value) with a frequency of 1 kHz.
(B) The saturation value of the temporal capacitance variation (%) was obtained by measuring a capacitance ($C_0$) at 40° C. in a thermostatic (or constant temperature) oven and thereafter periodically measuring the capacitance under the condition of applying bias of 2 V/μm until 1000 hours lapsed. The saturation value of the temporal capacitance was obtained by the formula $\Delta S=(\Delta C_{1000}/C_0) \times 100$, wherein $\Delta C_{1000}$ is the difference between those measured at t=0 and t=1000 hours.

TABLE

| Sample No. | Microscopic structure Ratio of grains as a function of Domain width [%] | | | Electrical characteristics of ceramic capacitor | |
|---|---|---|---|---|---|
| | Less than 20 nm | 20 to 50 nm | Greater than 50 nm or without twin | Dielectric constant | Saturation value of temporal capacitance variation [%] |
| 1·X· | 24 | 20 | 56 | 2630 | -17 |
| 2·X· | 13 | 34 | 53 | 2870 | -20 |
| 3 | 9 | 42 | 49 | 3090 | -24 |
| 4 | 4 | 54 | 42 | 3140 | -25 |
| 5·X· | 0 | 73 | 27 | 3310 | -31 |
| 6 | 3 | 70 | 27 | 3550 | -29 |
| 7 | 6 | 68 | 26 | 3620 | -25 |
| 8 | 18 | 53 | 29 | 3460 | -22 |
| 9 | 26 | 46 | 28 | 3630 | -22 |
| 10 | 38 | 41 | 21 | 3680 | -24 |
| 11 | 41 | 37 | 22 | 3710 | -27 |
| 12 | 49 | 34 | 17 | 3240 | -30 |
| 13·X· | 52 | 32 | 16 | 3180 | -32 |
| 14·X· | 39 | 28 | 33 | 2950 | -21 |
| 15 | 40 | 51 | 9 | 3660 | -25 |
| 16 | 44 | 55 | 1 | 3720 | -27 |
| 17 | 48 | 52 | 0 | 3730 | -27 |

·X·represents a comparative specimens.

Referring to Table, the test specimens 3, 4, 6 to 12 and 15 to 17 show that if the portion of the grains with the domain width less than 20 nm is smaller than or equal to 50%, that with the domain width in the range from 20 nm to 50 nm is 30% to 70%, and that with the domain width greater than 50 nm or without twin is equal to or less than 50%, the dielectric constant (∈) is equal to or greater than 3000 and the saturation values of the temporal capacitance variation is not less than -30%.

However, if the portion of the grains with the domain width less than 20 nm is greater than 50% as in the specimen 13, the saturation value is more than -30%. The test specimens 1 and 14 shows that, in case where the portion of the grains with the domain width in the range from 20 nm to 50 nm is smaller than 30%, a dielectric constant becomes less than 3000. Further, the test specimen 5 show that, in case where the portion of the grains having a domain width in the range from 20 to 50 nm is greater than 70%, the saturation value becomes smaller than -30%. In addition, the test specimens 1 and 2 show that in case where the portion of the grains with the domain width greater than 50 nm or without the twin is more than 50%, a dielectric constant becomes less than 3000.

EXAMPLE 2

$Ho_2O_3$ of Example 1 was partially or entirely replaced by other rare earth oxide, e.g., $Sm_2O_3$, $Eu_2O_3$, $Tb_2O_3$, $Dy_2O_3$, $Er_2O_3$, $Tm_2O_3$, $Yb_2O_3$, $Y_2O_3$. It was found that the capacitors obtained through same manufacturing procedure as in Example 1 exhibited same microscopic twin structure and electrical characteristics as those of Example 1.

Further, when $Mn_2O_3$ was replaced partially or entirely by $Cr_2O_3$ and $V_2O_5$, capacitors obtained through a same manufacturing procedure as in Example 1 also exhibited same microscopic twin structure and electrical characteristics as those of Example 1.

Furthermore, when the glass of 1.0 wt % was replaced by $SiO_2$ of 1.0 wt %, capacitors obtained through a same manufacturing procedure as in Example 1 also exhibited same microscopic twin structure and electrical characteristics as those of Example 1.

As the additives are diffused into $BaTiO_3$ grains to form solid solution and the crystallinity of the $BaTiO_3$ grains deteriorates, the period of the line patterns of the twin in the forms of parallel black and white lines becomes greater. If the crystallinity becomes further worsened, the line patterns of twin cannot be observed. Thus, in the present invention, the grains without twin were equally treated as those having the domain width greater than 50 nm.

Further, it is preferable that the ceramic grains include oxides of Ba and Ti as main components, oxides of Re and Mg, and one or more oxides selected from the group consisting of Mn, V and Cr, wherein Re represents one or two elements selected from the group consisting of Sm, Eu, Gd, Tb, Dy, Ho, Er, Tm, Yb and Y.

Furthermore, it is preferable that the dielectric ceramic composition includes 100 mol part of an oxide of Ba and Ti; 0.25 to 1.5 mol part of an oxide of Re; 0.2 to 1.5 mol part of an oxide of Mg; and 0.025 to 0.25 mol part of oxides of one or more elements selected from the group consisting of Mn, V and Cr, wherein the content of the oxide of Ba and Ti is calculated by assuming that the oxide of Ba and Ti is $BaTiO_3$; the content of the oxide of Re is calculated by assuming that the oxide of Re is $Re_2O_3$; the content of the oxide of Mg is calculated by assuming that the oxide of Mg is MgO; and the content of oxides of Mn, V and Cr is calculated by assuming that the oxides of Mn, V and Cr are $Mn_2O_3$, $V_2O_5$ and $Cr_2O_3$, respectively.

Further, it is preferable that the sintered ceramic body includes $SiO_2$ or a glass component having $SiO_2$, wherein the content of the glass component ranges from 0.05 to 5 wt %.

While the invention has been shown and described with respect to the preferred embodiments, it will be understood by those skilled in the art that various changes and modifications may be made without departing from the spirit and scope of the invention as defined in the following claims.

What is claimed is:
1. A dielectric ceramic composition comprising:
    sintered ceramic grains having a core-shell structure, wherein smaller than or equal to 50% of the grains have a domain width of twin less than 20 nm; 30% to 70% of the grains have a domain width of twin in the range from 20 nm to 50 nm; less than or equal to 50% of the grains have a domain width of twin greater than 50 nm or have no twin.

2. The dielectric ceramic composition of claim 1, wherein the ceramic grains include oxides of Ba and Ti as main components.

3. The dielectric ceramic composition of claim 1, wherein the sintered ceramic grains include an oxide of Re, an oxide of Mg, and oxides of one or more elements selected from the group consisting of Mn, V and Cr, Re representing one or two elements selected from the group consisting of Sm, Eu, Gd, Tb, Dy, Ho, Er, Tm, Yb and Y.

4. The dielectric ceramic composition of claim 1 further comprising about 100 mol part of an oxide of Ba and Ti; about 0.25 to 1.5 mol part of an oxide of Re; about 0.2 to 1.5 mol part of an oxide of Mg; and 0.025 to 0.25 mol part of oxides of one or more elements selected from the group consisting of Mn, V and Cr, wherein the content of the oxide of Ba and Ti is calculated by assuming that the oxide of Ba and Ti is $BaTiO_3$; the content of the oxide of Re is calculated by assuming that the oxide of Re is $Re_2O_3$; the content of the oxide of Mg is calculated by assuming that the oxide of Mg is MgO; and the content of oxides of Mn, V and Cr is calculated by assuming that the oxides of Mn, V and Cr are $Mn_2O_3$, $V_2O_5$ and $Cr_2O_3$, respectively, Re representing one or two elements selected from the group consisting of Sm, Eu, Gd, Tb, Dy, Ho, Er, Tm, Yb and Y.

5. The dielectric ceramic composition of claim 1, wherein the sintered ceramic grains include $SiO_2$ or a glass component having $SiO_2$.

6. The dielectric ceramic composition of claim 5, wherein the glass component ranges from 0.05 to 5 wt %.

7. The dielectric ceramic composition of claim 1, wherein a dielectric constant is equal to or greater than 3000.

8. A ceramic capacitor comprising:
   more than one internal electrode; and
   one or more dielectric layers composed of a dielectric ceramic composition, each of the dielectric layers being sandwiched between two neighboring internal electrodes,
   wherein the dielectric ceramic composition includes sintered ceramic grains having a core-shell structure, wherein smaller than or equal to 50% of the grains have a domain width of twin less than 20 nm; 30% to 70% of the grains have a domain width of twin in the range from 20 nm to 50 nm; less than or equal to 50% of the grains have a domain width of twin greater than 50 nm or have no twin.

9. The ceramic capacitor of claim 8, wherein the sintered ceramic grains include oxides of Ba and Ti as main components.

10. The ceramic capacitor of claim 8, wherein the sintered ceramic grains include an oxide of Re, and oxide of Mg, and oxides of one or more elements selected from the group consisting of Mn, V and Cr, Re representing one or two elements selected from the group consisting of Sm, Eu, Gd, Tb, Dy, Ho, Er, Tm, Yb and Y.

11. The ceramic capacitor of claim 8 further comprising about 100 mol part of an oxide of Ba and Ti; about 0.25 to 1.5 mol part of an oxide of Re; about 0.2 to 1.5 mol part of an oxide of Mg; and 0.025 to 0.25 mol part of oxides of one or more elements selected from the group consisting of Mn, V and Cr, wherein the content of the oxide of Ba and Ti is calculated by assuming that the oxide of Ba and Ti is $BaTiO_3$; the content of the oxide of Re is calculated by assuming that the oxide of Re is $Re_2O_3$; the content of the oxide of Mg is calculated by assuming that the oxide of Mg is MgO; and the content of oxides of Mn, V and Cr is calculated by assuming that the oxides of Mn, V and Cr are $Mn_2O_3$, $V_2O_5$ and $Cr_2O_3$, respectively, Re representing one or two elements selected from the group consisting of Sm, Eu, Gd, Tb, Dy, Ho, Er, Tm, Yb and Y.

12. The ceramic capacitor of claim 8, wherein the sintered ceramic grains include $SiO_2$ or a glass component having $SiO_2$.

13. The ceramic capacitor of claim 12, wherein the glass component ranges from 0.05 to 5 wt %.

14. The ceramic capacitor of claim 8, wherein the internal electrodes are formed of a base metal.

15. The ceramic capacitor of claim 8, wherein the ceramic capacitor fulfills X7R characteristic (EIA standards) or B characteristic (EIAJ standards).

16. The ceramic capacitor of claim 8, wherein a dielectric constant is equal to or greater than 3000.

* * * * *